Feb. 28, 1956 P. E. CLINGMAN 2,736,404
SEALING STRIP
Filed June 19, 1952
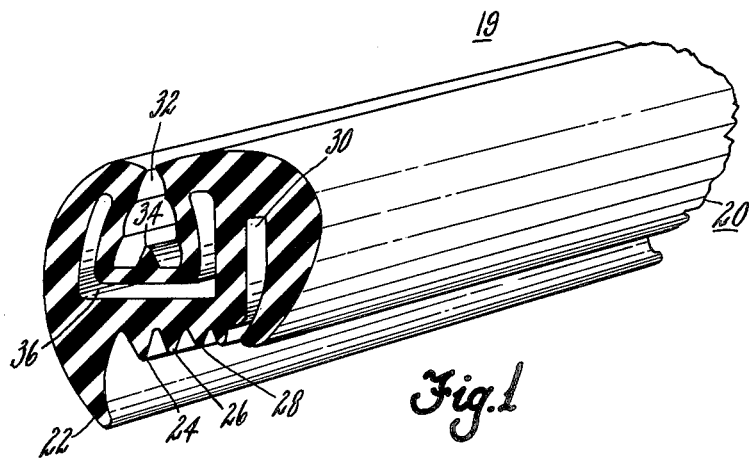
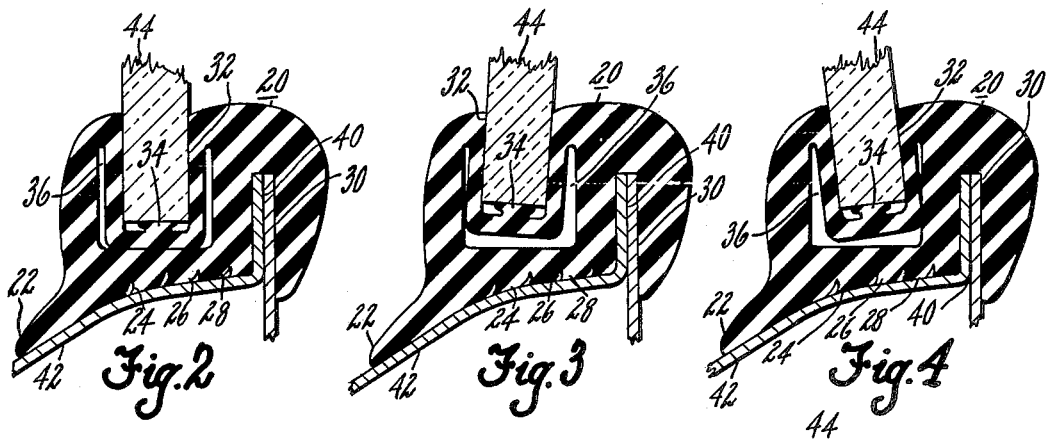
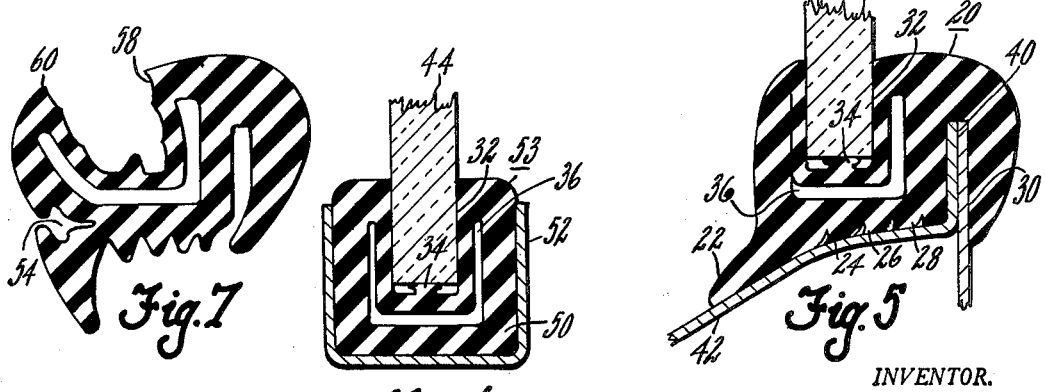
INVENTOR.
PAUL E. CLINGMAN
BY
HIS ATTORNEYS United States Patent Office 2,736,404
Patented Feb. 28, 1956

2,736,404

SEALING STRIP

Paul E. Clingman, Dayton, Ohio, assignor to General Motors Corporation, Detroit, Mich., a corporation of Delaware Application June 19, 1952, Serial No. 294,417

2 Claims. (Cl. 189—78)

This invention relates to sealing and connector strips and is particularly concerned with a self-adjusting connector strip for use with automobile bodies and the like.

It is, therefore, the basic object of this invention to provide a connector or sealing strip for connecting and sealing two panels, such as two panels made of metal, wood, glass, or combinations thereof, whereby the strip is self-adjusting for misalignment of said panels.

In carrying out the above object, it is a further object of the invention to provide a sealing strip for connecting two panels which comprises an elongate body of deformable resilient rubber-like material having a longitudinal groove extending therealong and a longitudinal panel-receiving channel closing said groove and integrally formed with said body, the channel being of such cross section relative to the groove as to be freely swingable therein for self-adjusting for misalignment between the panels to be joined.

In the manufacture of automobile bodies and the like, there is an increasing trend toward curved windshields and curved rear windows wherein divider strips are eliminated for increasing the area of visibility. These curved windows, for example, are difficult to manufacture to exact dimensions and wide tolerance is necessary particularly with respect to the curved portions thereof. Thus when a curved window is provided for an automotive body, said window is not always a perfect fit with respect to the aperture in the body in which it is to be applied.

It is general practice in the automotive industry to assemble the windows within such openings in the body through the use of a resilient rubber-like connector strip which fits over a pinch-weld in the body and has a window-receiving groove therein whereby the window or pane of glass is resiliently held within the body opening.

With curved windows, due to the discrepancies in the curvature thereof, the window often does not fit properly in the opening to which it is to be applied and there has been increasing difficulty in the use of sealing strips with these structures in the elimination of leakage around the window, such as, ingress of rain. This is due to the fact that improper curvature on the glass causes a gapping of one or both of the grooves in the strip which permits rain to drive beneath the window and into the body. Numerous expedients have been utilized to eliminate these past difficulties and, in many instances, large quantities of cement have been placed in the glass-receiving portions of the sealing strips to close the same with only moderate success in eliminating the leakage.

The present invention is directed to a new type of sealing strip wherein the glass-receiving channel is formed in a swing-like structure which is swingable within a groove of the main portion of the sealing strip whereby the glass-receiving channel may snugly embrace the glass at each side thereof while being laterally and perpendicularly movable within the sealing strip groove for self-adjustment for misalignment. This permits considerable tolerance in dimensions of the glass while maintaining a tight fit therearound through the sealing strip and in this manner many of the past difficulties of properly sealing windows have been eliminated.

Further objects and advantages of the present invention will be apparent from the following description, reference being had to the accompanying drawing, wherein preferred embodiments of the present invention are clearly shown.

In the drawing:

Fig. 1 is a fragmentary, perspective view, in cross section, of a sealing strip in the free form.

Figs. 2, 3, 4 and 5 are views of the sealing strip in cross section in assembled condition with the pinch-weld and glass pane, showing various self-adjustments within the strip in accordance with the position of the glass.

Fig. 6 is a view of a similar type of construction used in a strip to be inserted within a channel rather than over a pinch-weld.

Fig. 7 is a view of a modified form of strip using a wedge-type filler strip for closing the strip about the glass pane, and Fig. 8 is a view of a filler strip in cross section as used in connection with the sealing strip shown in Fig. 7.

A sealing strip 19, as described herein, is shown in perspective in Fig. 1 and comprises an elongate body of resilient rubber-like material 20 having a sealing lip 22 at one side thereof and a plurality of sealing flanges 24, 26 and 28 at the lower side thereof which engage the body and prevent rain from passing the strip. The strip 19 also includes a pinch-weld groove 30 extending longitudinally therealong and a glass-receiving channel 32 which has a sealing nub or projection 34 at the base thereof. The channel 32 is integral with the body of the strip 20 and is surrounded by a groove 36 which extends entirely therealong whereby the channel 32 is swingable within the groove 36.

In the installation of the strip, an automobile body is shown in Figs. 2 through 5 in fragmentary form wherein a pinch-weld 40 is provided which accommodates the groove 30 in the strip. The sealing flanges 24, 26 and 28 flare outwardly as shown against the body 42 while the main sealing flange 22 likewise is flared outwardly. This tends to improve the grip of the channel 32 along the glass pane 44 since it causes a tightening up of the groove 32 against the pane. The small projection 34 which extends longitudinally along the bottom of the channel 32 is shown compressed in Fig. 2 by the pane 44.

In Fig. 2 the pane is of an oversized dimension whereby the channel 32 is extended or stretched downwardly into engagement with the bottom of the groove 36. In Fig. 3 the pane is cocked to the left whereby the channel 32 swings against the side of the groove 36 while maintaining proper sealing around the pane. In Fig. 4 the pane is cocked to the right with a reverse condition being noted. In Fig. 5 the entire pane 44 is slightly misaligned to the left whereby the whole channel 32 shifts within the groove 36 to the right to accommodate the misalignment. From these views, namely, Figs. 2 through 5, it can be readily seen that misalignment or dimensional inaccuracy in the glass is easily taken up by the self-adjusting ability of the channel 32 whereby a tight seal is maintained entirely around the pane at all times.

Fig. 6 shows a modified strip 53 wherein the same type of glass channel 32 is used but wherein the strip 53 is of a block type cross section as shown at 50. The block 50 extends around the opening and is held within a metal channel 52 which closely embraces the block and tends to force the edges of the channel 32 into engagement with the pane. It is apparent that in this modification, the glass-receiving channel 32 is self-adjusting in the same manner as that shown in Fig. 1. Fig. 7 shows another modification of the invention wherein a filler strip 56 shown in cross section in Fig. 8 may be inserted within a longitudinal groove 54, after the glass has been set in the open channel 58. The open channel 58 has a normally outwardly extending lip 60 thereon. This makes it easier to install the glass therein. After the glass is in place, the filler strip 56 is inserted in the groove 54 to cause the flange 60 to be rotated toward the right into engagement with the pane of glass for sealing the same and for closing the groove 58. Filler strips of this character are well known and are shown in detail in Eichner Patents Nos. 2,189,137 and 2,189,138 and form no part of this invention, the modification merely being shown as another means of utilizing the swingable glass-receiving channel for adjusting and compensating for misalignment and dimensional discrepancies in the glass.

The material from which the strip may be made may be any deformable, resilient rubber-like material. Natural rubber, vulcanizable copolymers, mixtures thereof, suitable synthetic resins including vinyl compounds, etc., are all satisfactory as is any other material falling in the same general classes of compounds which exhibit the desired physical characteristics.

While the embodiments of the present invention as herein disclosed, constitute preferred forms, it is to be understood that other forms might be adopted.

What is claimed is as follows:

1. A sealing strip for holding a panel in a predetermined position relative thereto comprising, an elongated body of resilient rubber-like material including a longitudinally extending groove at one surface thereof, said body also including a longitudinally extending void substantially complementary in cross section to said groove and surrounding said groove and disposed entirely within said body, said groove and void therearound defining a preformed longitudinally extending channel therebetween that is attached to said body adjacent its longitudinal edges only whereby the channel is swingable within the void and relative to the body, said channel being adapted to receive said panel.

2. A sealing strip for holding a removable panel in position relative to a fixed panel comprising, an elongated body of resilient rubber-like material having a groove at one surface thereof adapted to engage the fixed panel, a second groove extending along the body and spaced from said first groove, said body also including a U-shaped void extending longitudinally thereof and surrounding said second mentioned groove whereby said void and said second mentioned groove define a pre-formed longitudinally extending panel receiving channel therebetween which is integrally connected to said body adjacent its longitudinal edges only, said channel being dimensioned so as to be freely swingable within the void and relative to the body, said channel being adapted to receive said removable panel.

References Cited in the file of this patent

UNITED STATES PATENTS

| | | |
|---|---|---|
| 1,751,786 | Best | Mar. 25, 1930 |
| 1,903,225 | Palenske | Mar. 28, 1933 |
| 2,233,335 | Axe | Feb. 25, 1941 |
| 2,430,873 | Haas | Nov. 18, 1947 |
| 2,612,972 | Heimgartner et al. | Oct. 7, 1952 |
| 2,615,212 | Beck | Oct. 28, 1952 |

FOREIGN PATENTS

| | | |
|---|---|---|
| 100,311 | Great Britain | Feb. 17, 1937 |